June 6, 1972   J. E. SHEPPARD   3,667,925
METHOD FOR BONDING WITH DEPOSITED PARTICULATE GLASS
Filed Feb. 19, 1970

INVENTORS
JOHN E. SHEPPARD
VINCENT J. PELLECHIA
BY

Frank D. Prager

ATTORNEY

United States Patent Office 3,667,925
Patented June 6, 1972

3,667,925
METHOD FOR BONDING WITH DEPOSITED PARTICULATE GLASS
John E. Sheppard, Cornwells Heights, and Vincent J. Pellechia, Lansdale, Pa., assignors to General Instrument Corporation, Newark, N.J.
Filed Feb. 19, 1970, Ser. No. 12,679
Int. Cl. C03c 29/00
U.S. Cl. 65—43          7 Claims

ABSTRACT OF THE DISCLOSURE

A process for applying glass to frame-like spacers for glass-sealing the spacers to lids and for thereby closing flat packs. The spacers are submerged in a liquid suspension of enough glass powder to settle such powder onto each spaced in the form of a mound. The base width of the spacer elements determines the depth of the mound. This in turn facilitates accurate dimensioning of the space provided inside the flat pack.

BACKGROUND OF THE INVENTION

For the fabrication of electronic and microelectronic devices in the form of flat packs it is necessary to encapsulate the devices in a shallow chamber. In many cases this chamber must be closed by a lid spaced a small distance from the base member of the flat pack. For such spacing it is usually preferred to use a frame-like spacer that surrounds the shallow chamber. In many cases the spacers are minute, and the spacing of the lid from the base member should be very accurate. Usually the closure should be hermetically tight.

Various methods have been used to apply a glass layer of predetermined thickness to a metallic frame member or spacer, to provide for subsequent sealing of the spacer to a ceramic lid. However, difficulty was encountered in effecting the necessary precise control over the thickness of the layer. The latter control is essential in the interest of proper and accurate production of standardized flat packs. Heretofore, control over the thickness of the glass has been achieved by initially forming the glass as a separate preformed ring, but that solution to the problem is not inviting, as it adds to the number of delicate parts that must be manipulated in the fabricating process.

NATURE OF THE INVENTION

It occurred to us that a glass layer can be deposited in closely controlled thickness, by simply submerging a narrow frame member in a suspension containing enough glass powder to settle as a mound on said member, or advantageously on successive members as a narrow, elongate mound of upwardly peaked cross-section. The height of the complete, settled glass mound is limited solely by the width of the member, whereon the glass sediment settles, so long as glass powder is present in sufficient quantity to complete the mound to such height as is determined by the angle of repose of the sediment. This height is not altered by the length of any additional settling period, or by changes of liquid temperature and of other process conditions.

Preferred manner of carrying out the new process

Figure 1:
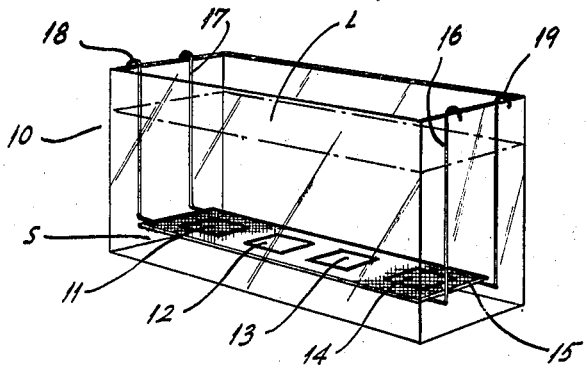
FIG. 1 is a perspective view of a settling tank for utilization of the new method of glass coating by settling.

As shown in FIG. 1, settling tank 10 (shown as a transparent unit) has flat pack spacer frames 11, 12, 13, 14 supported therein, on a fine mesh screen 15 suspended in the vessel by a holding fixture. This fixture as shown comprises a plurality of vertical arms 16, 17 secured to ends of the screen and having hooks 18, 19 at their upper ends, to engage upper edges of the walls of the tank. The tank is filled with a liquid L containing particles P (FIG. 5) or glass powder suspended therein, these particles being of such size—typically 100 to 600 mesh—that they remain suspended for at least some minutes, but ultimately settle from the liquid and form a sediment on underlying surfaces. As further shown (FIG. 1), screen 15 with spacer frames 11, 12, 13, 14 thereon, is lowered into the tank wherein the suspension is maintained, and the glass powder is permitted to settle onto the frames and screen. The mesh of the screen is wide enough to let the particles freely settle through it to an underlying sedimentation space S, and the wires are fine enough so as to intercept very little material.

Figure 2:
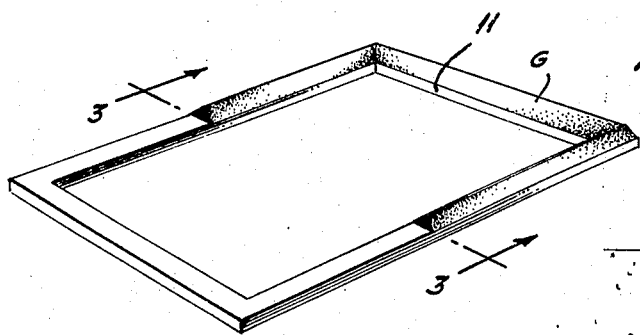
FIG. 2 is a similar but larger view of a frame-shaped spacer that has been treated by the new method.
Figure 5:
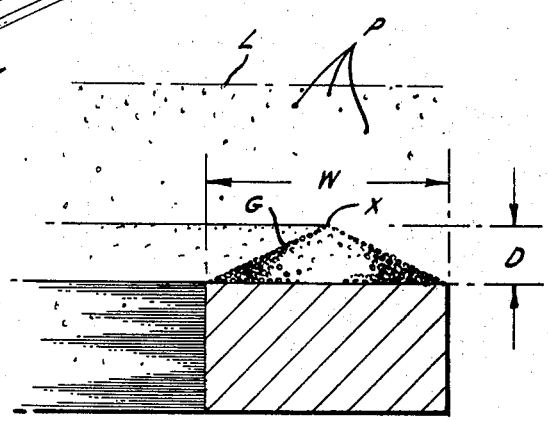
FIG. 5 is a fragmentary cross-section of the frame, showing a detail from FIG. 3 on a considerably larger scale.
Figure 3:
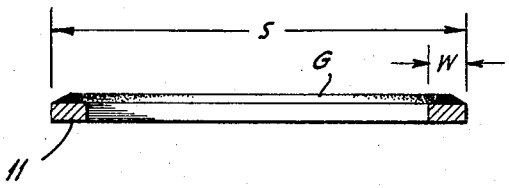
FIG. 3 is a cross-section though this frame, taken along lines 3—3 in FIG. 2.

As shown in FIGS. 2, 3 and 5, the frame members have a surface width W. Glass powder settles on them, up to a depth D, dependent on that width and on the angle of repose of the fluid sediment in the liquid. Once the depth D has been reached, which typically occurs in a certain number of minutes of sedimentation, the depth of glass powder sediment on frame 11 no longer increases, not even if the settling be allowed to continue for further minutes or hours. Of course it is assumed that enough space S, FIG. 1, is provided below the screen, supporting the frames, to accumulate sediment without submerging the frames therein. Accordingly, as long as there is sufficient material P in liquid L to complete at least one heap or mound G up to peak X thereof, the settling operation of the new mehod results in consistent depth and thickness D of deposited glass, dependent solely on the width W of the narrow frame members, FIG. 5, and unaffected by the exact amount of material in suspension, the temperature maintained and other variables. The production of frames, coated with a predetermined thickness of glass thereon, can continue without adjustment or readjustment of such process factors as the concentration of the glass suspension, so long as a suspension, with substantial amounts of settleable glass powder therein, is maintained in the tank.

After settling, the frames are removed from tank 10 and fired at low heat to drive off the liquid. The frames can then be handled for storage and similar "logistics" and for subsequent assembly. To render the settled frames less delicate, a binder may be included in the liquid mix. For example liquid substrate L of the glass powder suspension can be mixed with a cellulosic or acrylic substance or other temporary binder, such as nitrocellulose in low concentration in a suitable alcohol, to enhance the cohesion or "handling strength" of the settled glass.

Figure 4:
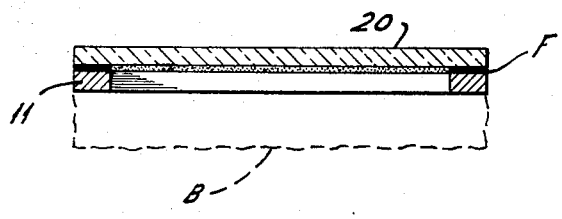
FIG. 4 is a similar cross-section, showing the frame fused to a lid.

When a suitable layer of glass G has been formed by such procedures (which layer is shown in partly broken-off condition in FIG. 2), a conventional ceramic lid 20 is sealed to the glass-covered frame surface, FIG. 4. This is done by sintering or heat-fusing the glass to ceramic 20 and frame 11, and thereby converting the peaked glass mound G into a flat, fused layer F having a height of about D/2. In this way frame 11 becomes a spacer for lid 20, providing a flat pack chamber of predetermined depth above a base B. The base can be made of suitable metal. The depth of the chamber is controlled by the thickness of frame 11 and fused glass layer F thereon. The thickness of this layer in turn is dependent on the original depth D of glass layer G, and thereby on the width of frame element 11.

Glass powder sediment settling in water and similar liquids generally has an angle of repose steep enough to produce a mound that typically is a few times wider, for example about 4 times wider, at the base than it is high. Therefore, and since depth $D/2$ is fixed by the physical requirements of the glass fusing and sealing process, the new process advantageously uses a width W of the spacer members equalling only about 8 times the thickness of the ultimate glass layer F, or more generally uses a width about one order of magnitude greater than this thickness. This width of course is considerably smaller than the total side length S of a frame 11.

If a glass layer either deeper or shallower than D is desired, modified frames are immersed in the suspension, which have, respectively, limbs of greater or lower width than W. Depth D of glass settled on the frames remains uniform so long as width W is uniform and a settleable suspension is maintained in the tank.

In a typical and preferred application of the new method, particles P of hard, ground borosilicate glass are settled on nickel-cobalt-iron frames 11 having a width W of 50 mils. This results in a settled layer G of ground glass having a depth D of about 12 mils thickness, plus or minus 3 mils, so long as glass ground to a 400 mesh powder is kept in suspension. The suspension can be at or about room temperature. The process yields flat pack spacers of adequately controlled dimensions, regardless of wide variations in this temperature and in other process conditions. The simple operations of the process can be performed by unskilled operators. Waste of useful material is avoided. The sediment, collected in the settling tank below the frames, can be re-dispersed and re-used at any time.

We claim:

1. A process for applying glass powder to frame-like spacers to be used for sealing a lid to said spacers, said spacers comprising limbs for supporting said lid, comprising the steps of providing a liquid suspension of glass powder, and causing such powder to settle therefrom onto a spacer in generally particulate form and in sufficient amount to substantially complete an upwardly peaked mound of glass sediment particles on said limbs of said spacer, whereby the width of the limb determines the thickness of the settled layer of glass powder, and thereafter sealing a lid to said spacer limbs by means of said glass powder.

2. A process as described in claim 1, wherein said suspension contains enough glass powder to deposit said amount thereof on a succession of said spacers.

3. A process as described in claim 2, also including the step of collecting excess glass powder below said spacers, and periodically stirring it into suspension.

4. A process as described in claim 1 wherein said powder has a particle size of about 100 to 600 mesh.

5. A process as described in claim 4 wherein said powder has a particle size of about 400 mesh.

6. A process as described in claim 1 wherein said liquid suspension contains a binder for the settled glass.

7. A process as described in claim 6 wherein said binder is of the temporary kind, such as an acrylic or cellulosic substance.

References Cited
UNITED STATES PATENTS

| | | | |
|---|---|---|---|
| 2,633,426 | 3/1953 | Koller | 117—27 |
| 3,208,892 | 9/1965 | Miller et al. | 117—125 X |
| 3,459,569 | 8/1969 | Ellis | 65—43 X |

S. LEON BASHORE, Primary Examiner

R. L. LINDSAY, JR., Assistant Examiner

U.S. Cl. X.R.

65—59, 60; 117—27